(12) United States Patent
Meyer

(10) Patent No.: US 8,477,876 B2
(45) Date of Patent: Jul. 2, 2013

(54) FAST BLIND CHANNEL SEARCH

(75) Inventor: Jacques Meyer, Saint-Martin-le-Vinoux (FR)

(73) Assignee: STMicroelectronics (Grenoble) SAS, Grenoble (FR)

( * ) Notice: Subject to any disclaimer, the term of this patent is extended or adjusted under 35 U.S.C. 154(b) by 6 days.

(21) Appl. No.: 13/336,576

(22) Filed: Dec. 23, 2011

(65) Prior Publication Data

US 2012/0327977 A1   Dec. 27, 2012

(30) Foreign Application Priority Data

Dec. 23, 2010  (FR) ...................................... 10 05100

(51) Int. Cl.
*H04L 27/00* (2006.01)

(52) U.S. Cl.
USPC ............................ 375/324; 375/340; 329/346

(58) Field of Classification Search
USPC ............................ 375/324–326, 340; 329/346
See application file for complete search history.

(56) References Cited

U.S. PATENT DOCUMENTS 5,282,228 A * 1/1994 Scott et al. ................... 375/344
2006/0044477 A1 3/2006 Meyer

OTHER PUBLICATIONS

Jingyan et al., "Cyclostationarity-based Symbol Timing and Carrier Frequency Offset Estimation for OFDM System," IEEE International Conference on Computer Application and System Modeling, Oct. 22-24, 2010, Taiyuan, China, XP031788918, pp. V5-546-V5-550.
Malady et al., "Detection of CPM Based on Second-Order Cyclostationarity," IEEE 44th Asilomar Conference on Signals, Systems and Computers, Nov. 7-10, 2010, Pacific Grove, CA, USA, XP031860664, pp. 501-505.
French Search Report for corresponding French Application No. 1005100, mailed Aug. 12, 2011, 6 pages.

* cited by examiner

*Primary Examiner* — Curtis Odom
(74) *Attorney, Agent, or Firm* — Seed IP Law Group PLLC

(57) ABSTRACT

A method for searching a digital transmission having unknown carrier and symbol frequencies in a modulated reception signal, includes performing successive trials of several carrier and symbol frequencies, using decreasing values of the symbol frequency, demodulating the reception signal with the tried carrier frequency, filtering the demodulated signal in a band having a width corresponding to the currently tried symbol frequency, and producing samples of the filtered signal. For each currently tried symbol frequency, forming a complex indicator having a real component and an imaginary component established from the successive samples of the filtered signal such that they have cyclostationary properties and that one of the components tends to cancel when the other component tends towards a relative maximum, building the spectrum of the variation of the complex indicator, searching for a singular spike in the spectrum, and determining the real symbol frequency from the frequency of the spike.

20 Claims, 4 Drawing Sheets

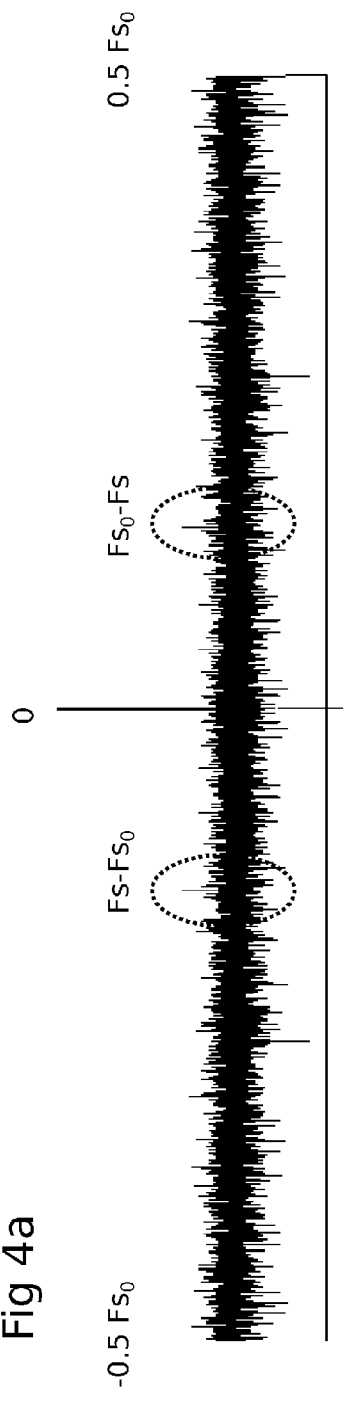
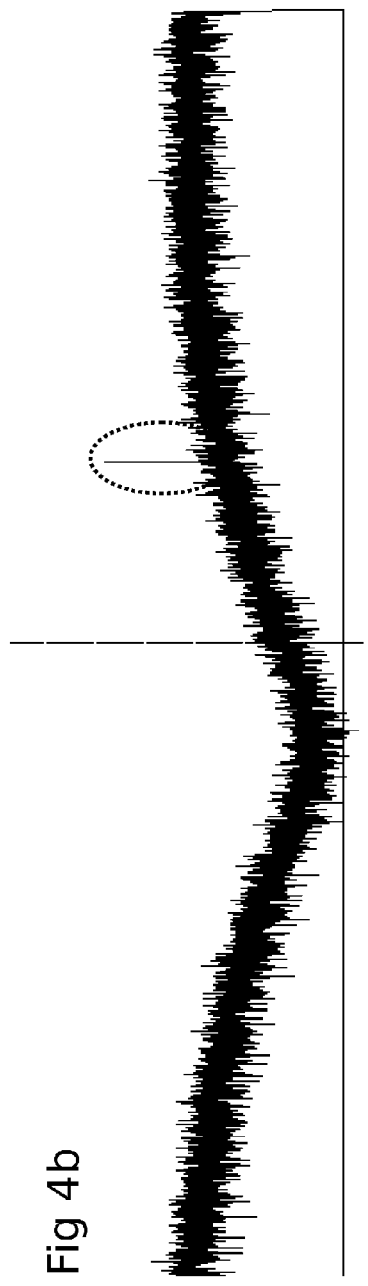
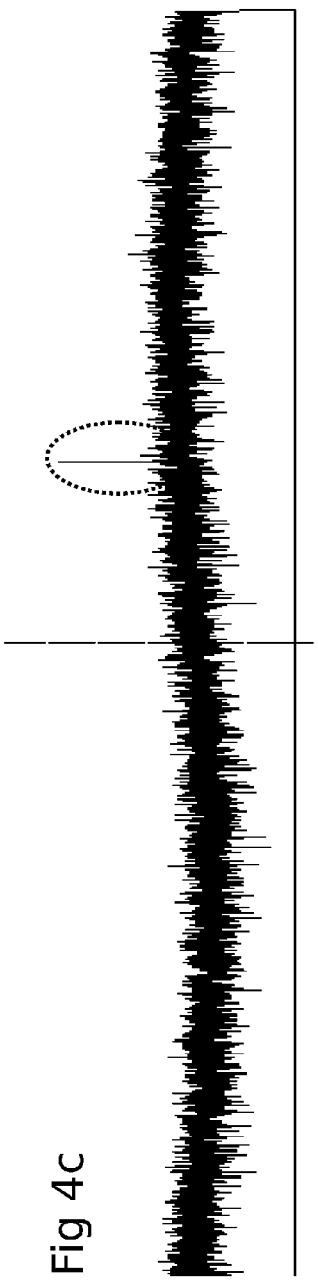
Fig 4a
Fig 4b
Fig 4c

FAST BLIND CHANNEL SEARCH

BACKGROUND

1. Technical Field

The present disclosure relates to demodulators for digital transmissions, and more specifically to the blind search of transmission channels present in a modulated signal.

2. Description of the Related Art

FIG. 1 schematically shows several television channels carried on a modulated signal of a satellite transmission. The useful bandwidth for the channels is illustrated between 950 and 2150 MHz. A first channel has a central frequency Fc1 and a bandwidth Fs1. The second channel has a central frequency Fc2 and a bandwidth Fs2. Other channels have respective central frequencies and respective bandwidths. The central frequency of a channel is also the modulation frequency used for the signal transmitted in the channel. The bandwidth at half-power corresponds to the data rate of the channel, and it is usually equal to the symbol frequency, a "symbol" being the portion of a signal corresponding to one or several bits, according to the type of modulation used. The symbol frequency can conventionally reach 50 MBaud.

As shown for the first three channels, a channel is supposed to have a standardized envelope, trapezoidal and symmetric with respect to the central frequency. Moreover, the rising and falling edges transition smoothly into the horizontal portions. The signal amplitude varies from one channel to the other.

Many satellite channels, used by well-established content providers have a known and invariable central frequency and symbol frequency. Demodulation equipment can thus be preset to receive these channels without the intervention of the user.

Nevertheless, users may wish to receive all the programs available on the satellites. It is then necessary to find channels whose parameters are unknown or variable, used by providers who are inconsistent or do not publish the parameters. The demodulator should in this case be capable of a "blind" search for the available channels, i.e., finding the channels without knowing their parameters.

For a demodulator to lock on a channel, it identifies the central frequency and the symbol frequency of the channel. A blind seek is thus a two-dimensional search.

A brute-force method, using successive trials, includes adjusting the symbol frequency by increments and scanning the whole range of central frequencies for each increment of the symbol frequency. For each trial, the demodulator stabilizes and several thousand symbols should be transmitted in order to ascertain that the current setting corresponds to a channel. The frequency increments are limited to the capture range of the demodulator, both for the central frequency and the symbol frequency. Considering conventional transmission constraints, the capture range is in the order of 1% of the adjusted frequency. The number of trials attempted to scan all the possibilities with such a small step takes a long time.

United States Patent Application No. 2006/0044477 discloses a method for accelerating the search, based on the standardized shape of the envelopes of the channels. It consists in sliding a window across the range of central frequencies and to find, by spectrum analysis in the window, the centers of the edge portions of the envelopes. The central frequencies are then estimated half way between the thus identified edges.

However, due to the less than optimal transmission and reception conditions increasingly encountered, the channels, like the last one shown in FIG. 1, may be distorted such that their envelopes no longer conform to the standards. Such channels cannot be found with the solution disclosed in the above-mentioned patent application.

BRIEF SUMMARY

There is thus a need for a fast blind channel search method that can find channels with a distorted envelope.

This need may be fulfilled by a method for searching a digital transmission having unknown carrier and symbol frequencies in a modulated reception signal, including performing successive trials of several carrier and symbol frequencies, using decreasing values of the symbol frequency, demodulating the reception signal with the tried carrier frequency, filtering the demodulated signal in a band having a width corresponding to the currently tried symbol frequency, and producing samples of the filtered signal. For each currently tried symbol frequency, forming a complex indicator having a real component and an imaginary component established from the successive samples of the filtered signal such that they have cyclostationary properties and that one of the components tends to cancel when the other component tends toward a relative maximum, building the spectrum of the variation of the complex indicator, searching for a singular spike in the spectrum, and determining the real symbol frequency from the frequency of the spike.

According to an embodiment, the method includes, if the spike is located in a first half of said band, determining the real symbol frequency from the frequency of the spike, else reiterating with a new trial symbol frequency smaller than half of the current trial symbol frequency.

According to an embodiment, one of the components of the complex indicator represents a timing error criterion of the Gardner algorithm, and the samples of the filtered signal are produced at twice the trial symbol frequency.

According to an embodiment, the other component of the complex indicator represents a lock criterion of a loop used for adjusting the sampling times.

According to an embodiment, the lock criterion represents the variation of the square of the amplitude of the samples between the odd and even samples.

According to an embodiment, the spectrum is built by calculating Fourier transforms of several groups of consecutive values of the complex indicator; and calculating the average powers by frequency of the Fourier transforms.

According to an embodiment, the components of the complex indicator are considered zero if the vector corresponding to the current sample turns less than 90° with respect to the vector of the previous sample.

BRIEF DESCRIPTION OF THE SEVERAL VIEWS OF THE DRAWINGS

Other advantages and features will become more clearly apparent from the following description of particular embodiments of the invention provided for exemplary purposes only and represented in the appended drawings.

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not intended to convey any information regarding the actual shape of the particular elements and have been solely selected for ease of recognition in the drawings. One or more embodiments are described hereinafter with reference to the accompanying drawings in which:

FIGS. 4a to 4c show the spectra of the variations of different criteria used for finding an unknown symbol frequency.

DETAILED DESCRIPTION

Figure 1:
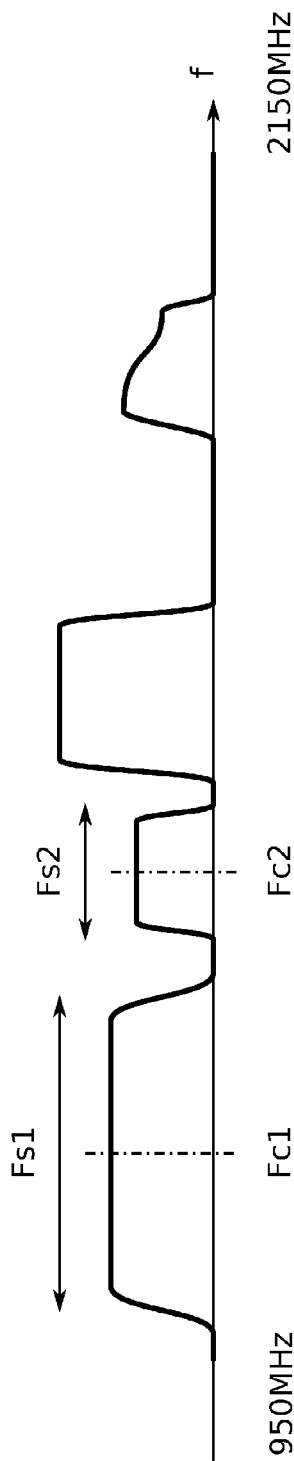
FIG. 1 schematically shows channels in a satellite transmission band.
Figure 2:
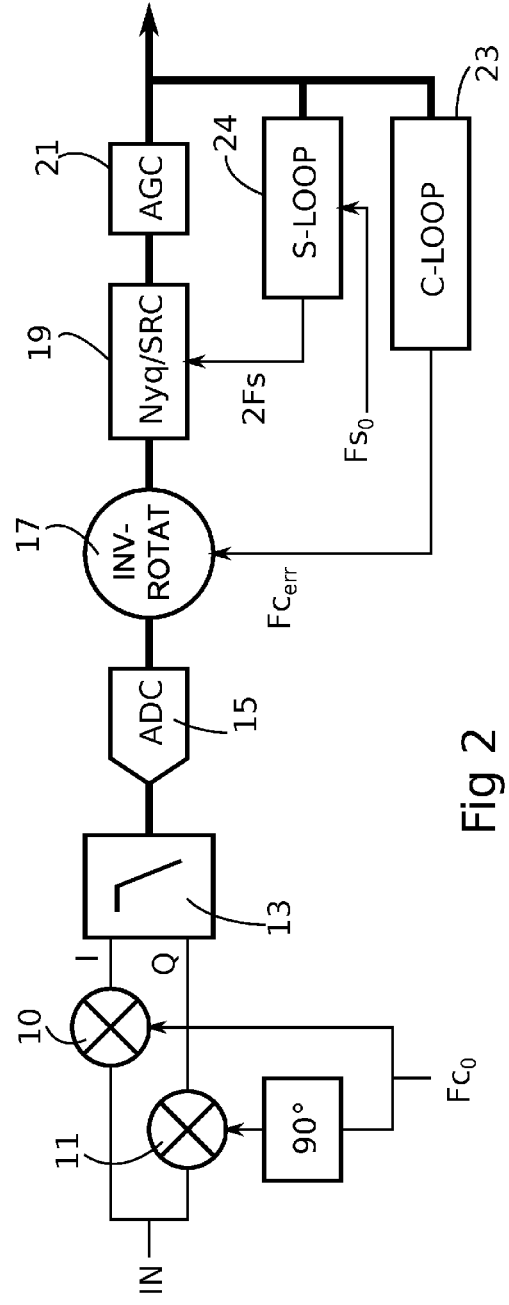
FIG. 2 schematically shows a demodulator usable for processing satellite transmission signals.

FIG. 2 schematically shows a demodulator 100 embodiment, adapted to satellite signals, configurable to demodulate a channel having a known central frequency Fc and a known symbol frequency Fs. An incoming modulated signal IN has been transposed in the 950-2150 MHz band by the low noise block down converter (LNB) of a satellite dish. Signal IN has been quadrature phase modulated, according to the quadrature phase shift keying (QPSK) method, and carries two baseband signals I and Q.

In order to extract signals I and Q, signal IN is applied to the first input of two multipliers 10 and 11 that receive, on a second input, respectively, a demodulation signal $Fc_0$, and this same signal $Fc_0$ delayed by 90°. Signal $Fc_0$ is a signal whose frequency is preferably equal to the real channel frequency Fc, but this frequency varies within a margin of uncertainty. The pair of signals I and Q provided by multipliers 10 and 11 is low-pass filtered with a low pass filter 13, and analog to digital converted with an analog-to-digital converter (ADC) 15.

The demodulation frequency $Fc_0$ applied to multipliers 10 and 11 being approximate, the vector having components I and Q turns at a speed corresponding to the demodulation frequency error. This rotation is corrected by an inverse-rotation circuit 17 that receives a set point $Fc_{err}$ corresponding, in an established mode, to the carrier frequency error.

Rotation corrected signals I and Q are provided to a passband filter and sampling circuit 19 (e.g., a Nyquist spectral raised cosine filter) clocked at a frequency 2Fs, at twice the symbol frequency Fs. The band of the filter 19 is adjusted at ±½Fs, and the circuit takes two samples for each symbol, one preferably at the center of the symbol, and the other at the transition between two symbols.

The samples of signals I and Q are then normalized by an automatic gain control circuit 21 (AGC) for further processing. The normalized values of the samples are used by two adjustment loops 23 and 24.

Loop 23 adjusts the set point $Fc_{err}$ of the rotation correction circuit 17. Loop 24, in practice a phase locked loop, adjusts the frequency and the phase of sampling signal 2Fs of circuit 19, in order to set the sampling times preferable with respect to the symbols carried on signals I and Q. The loop uses a reference frequency $Fs_0$ preferably equal to the real symbol frequency Fs.

Each of the loops 23 and 24 has a capture range in the order of ±1% of its reference frequency ($Fc_0$, $Fs_0$) with the signal to noise ratio conditions (SNR) implemented by conventional standards.

Figure 3:
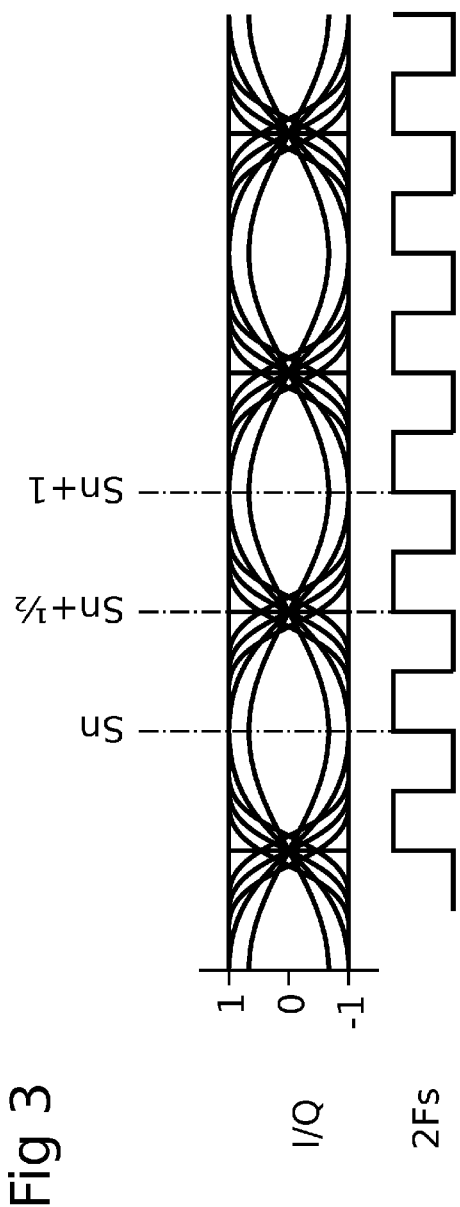
FIG. 3 schematically shows a succession of symbols in a demodulated signal, sampled at selected times for reconstructing the transmitted bits.

FIG. 3 illustrates, in the form of an "eye diagram," an embodiment having all the possible variations over several symbols of signals I and Q at the input of sampling circuit 19. A "symbol" is here the portion of a signal I or Q representing one bit, the binary values of the bit being represented at the transmission side by voltage levels of same amplitude but opposite signs, levels shown here by normalized values 1 and −1.

The sampling clock 2Fs is shown with its preferable frequency and phase, conditions to which loop 24 tends. The rising edges of a first parity, say even, of clock 2Fs coincide with the centers of the symbols. The values sampled at the centers of the symbols, designated "symbol samples", are noted Sn, Sn+1, and so on. The odd rising edges of clock 2Fs coincide with the transitions between symbols. The values sampled at the transitions are designated "inter-symbol samples" and are noted Sn−½, Sn+½, and so on.

In the case of a QPSK modulation, where two demodulated signals I and Q are available, each sample S is in fact a vector or a complex value whose real component is formed of a sample of signal I and whose imaginary component is formed of the corresponding sample of signal Q.

It is devised in this disclosure to put in practice certain theoretical studies that tend to demonstrate that statistical moments of order 2 or greater, established from an output signal of a demodulator, have cyclostationary properties, even if the demodulator is inaccurately adjusted. Such a study is disclosed, for example, in article "ML-based blind symbol rate detection for multi-rate receivers", from Henk Wymeersch and Marc Moeneclaey, ICC May 2005, Seoul. A statistical moment of order 2 for successive samples may be, for example, the square of each sample, or the product of two consecutive samples.

Where complex samples are used, such a statistical moment may be the square of the modulus of the sample.

FIG. 4a shows the spectrum of the variation of the square of the modulus in the frame of an embodiment with a bad SNR, near 1, i.e., the worst-case provided for in the current standards. This spectrum, as it may be preferably applied, is not directly provided by a Fourier transform. It is built by first calculating several Fourier transforms over a representative number of consecutive values of the square of the modulus. For example, 10 transforms are calculated over 8192 values. The spectrum is then obtained by averaging the powers provided by the Fourier transforms for each frequency.

The sampling frequency is adjusted at $2Fs_0$. This places the band of filter 19 between −½$Fs_0$ and −½$Fs_0$, corresponding to the limits of the studied spectrum. The spectrum is shown centered at 0, bearing in mind that the same spectrum is present at the multiples of the chosen carrier frequency $Fc_0$.

It is assumed that the actual symbol frequency Fs is between ½$Fs_0$ and $Fs_0$. As indicated on FIG. 4a, the spectrum includes corresponding symmetrical spikes at Fs−$Fs_0$ and $Fs_0$−Fs. The spikes are hardly recognizable with the naked eye; they would be even harder to detect by hardware or software. Moreover, without knowing frequency Fs, an uncertainty in the choice of the spike must be raised. Indeed, assuming Fs=$Fs_0$−f, the spikes could also correspond to a frequency Fs=f, a channel that could also be present in the band of the filter.

It is thus desirable to establish a statistical moment of order 2, in other words a cyclostationary criterion, whose spectrum is easier to exploit, namely in which the spikes are easier to discriminate and present no ambiguity as to their choice.

The ambiguity may be raised by establishing a complex indicator Ct whose real and imaginary components vary in phase quadrature. The spectrum of such an indicator presents a single spike per frequency effectively present in the studied band.

Further, obtaining a spike of exploitable amplitude is achieved by preferably choosing the components of the complex indicator Ct. One embodiment that provides good results is described below.

In loop 24, the Gardner algorithm is often used to correct the phase and the frequency of sampling clock 2Fs. This algorithm uses a timing error criterion built from three successive samples S output by the demodulator 100. This criterion happens to be cyclostationary. It is calculated every 2 samples, i.e., at each symbol, and is expressed by:

$$G_{n+1} = (S_n - S_{n+1}) S_{n+1/2}.$$

When using complex samples, it is preferably written:

$$G_{n+1} = R[(S_n - S_{n+1}) S^*_{n+1/2}],$$

where R designates the real part and * designates the conjugate complex value.

This error criterion is taken, for example, as the real part of complex indicator Ct. A candidate is now needed for the imaginary part, a cyclostationary signal varying in phase quadrature with respect to the error criterion.

Such a signal may be a lock criterion of loop 24. Indeed, a lock criterion presents a relative high point (e.g., maximum) when the timing error cancels. If the timing error and lock criteria are in addition cyclostationary, they will have the same frequency and be in phase quadrature. The following cyclostationary criterion for the imaginary part is proposed, calculated for each symbol:

$$L_{n+1} = |S_n|^2 + |S_{n+1}|^2 - 2|S_{n+1/2}|^2.$$

This criterion represents the variation of the square of the amplitude between the symbol samples and the inter-symbol samples (even and odd samples).

FIG. 4b shows the spectrum of the variation of an indicator obtained by an embodiment using this choice, in the same conditions as in FIG. 4a. A single spike is obtained, which can be qualified as singular, having an amplitude distinctly greater than that of the other spikes.

It will be observed that the envelope of the spectrum, having a low point near 0, tends to increase as it approaches the lower limit of the band. Depending on the operating conditions, the envelope of the spectrum could even reach the amplitude of the singular spike in this area, making the singular spike harder to detect.

In order to improve the situation, it is proposed to cancel indicator Ct when it likely does not correspond to a transition of the symbol value. This condition may be indicated by the fact that the vector corresponding to a sample Sn has rotated by less than 90° with respect to the vector of the preceding sample Sn−1. This is translated by:

$$R[S_n \cdot S^*_{n-1}] > 0.$$

In summary, optimal rules for establishing complex indicator Ct are:

If $R[S_n \cdot S^*_{n-1}] < 0$, $Ct_n = G_n + jL_n$,

Else $Ct_n = 0$.

FIG. 4c illustrates the spectrum obtained with an embodiment using this enhancement, in the same conditions as in FIG. 4b. It will be noted that the envelope of the spectrum is substantially flat. Under these conditions, the singular spike may be identified by simply extracting a high point (e.g., the maximum) value of the spectrum.

The components of criterion Ct are preferably normalized so that the modulus of this criterion remains substantially constant or, in other words, that the vector representing this criterion have a substantially circular trajectory. Indeed, if the trajectory of the vector is elliptic, a parasitic spike will appear in the spectrum, symmetric to the searched spike, whose amplitude tends towards the amplitude of the searched spike as the ellipse flattens.

It will be noted that any channel contained within the band of filter 19 will produce a spike in the spectrum. A channel mostly contained within the band will also produce a spike; a spike remains distinguishable if more than 90%, approximately, of the channel is contained within the band. The channel may even be wider than the band by approximately 10%, in which case a spike will appear slightly beyond ½Fs$_0$. If the channel is contained by less than 90% in the band, no spike appears, or the spike is indistinguishable and is assimilated to noise.

In order to achieve a blind search of a channel with these teachings, one embodiment can proceed as follows. The search is based on successive trials of carrier and symbol frequencies Fc and Fs.

For a given trial value Fc$_0$ of the carrier frequency, an embodiment begins by trying a symbol frequency Fs$_0$ slightly greater than a high (e.g., maximum) expected symbol frequency, thus adjusting the initial band of filter 19 to ±½Fs$_0$. If the successive trials of the carrier frequency are achieved by increasing steps, the first step may be chosen so that the initial band of the filter starts at the beginning of the transmission band, i.e., 950 MHz for satellite transmissions. In a non-limiting embodiment, bearing in mind that a high (e.g., maximum) symbol frequency is in the order of 40 MBauds, the initial band of the filter is adjusted at Fs$_0$=50 MHz, and the first trial value of the carrier frequency is 975 MHz.

Situation 1: The spike, of frequency Fpk=Fs$_0$−Fs, is located between 0 and ½Fs$_0$ (FIGS. 4a-4c).

This means that there is likely a channel having a symbol frequency Fs=Fs$_0$−Fpk. The corresponding channel occupies more than half of the band, say 30 MHz, and it is entirely contained within the band, within a tolerance margin. One single channel can correspond to these characteristics. Its carrier frequency Fc is located within a restricted range of width Fs$_0$−Fs=20 MHz centered on the tried carrier frequency Fc$_0$.

This corresponds to the well-known situation of finding a channel with a known symbol frequency but having an uncertain carrier frequency. The carrier frequency may thus be searched by trying successive values Fc$_0$, scanning this restricted range. It is not useful to reconstruct the spectrum for each of these trials. The carrier frequency will be found as soon as it is located in the capture range of loop 26 and the loop locks.

In fact, in the frame of a QPSK modulation, the offset between the frequencies Fc and Fc$_0$ may be directly determined as the frequency of the spike produced by a Fourier transform calculated on the 4th power of the complex input signal of filter 19. This calculation may be generalized to an M-PSK modulation, where M is the number of points of the modulation constellation, the Fourier transform then being calculated on the M-th power of the input signal of filter 19.

Situation 2: The spike at frequency Fpk is located between −½Fs$_0$ and 0.

The channel width, say 15 MHz, is smaller than half the band. The band may thus contain several channels having this same width. If it is desired to find all these channels, a new trial will be performed while reducing the bandwidth of the filter, so that these ambiguous channels cannot be located together in the new band. The new symbol frequency to try $Fs_0$ may be chosen slightly greater than the frequency corresponding to the spike, say 20 MHz, thus adjusting the new bandwidth to less than half of the current bandwidth. The carrier frequency $Fc_0$ is readjusted so that the new band starts at the beginning of the current band, 950 MHz in the example, with $Fc_0$=960 MHz.

Successive carrier frequencies are then tried, while observing the spectrum at each trial, until a spike appears in the spectrum. A first ambiguous channel has then been found, as in situation 1, where the spike corresponds to a single channel.

The carrier frequency trials are continued in order to find the eventual other ambiguous channels, until the entire initial band of the filter, 50 MHz, has been scanned.

Once a first band of the filter has thus been scanned, the same process is reiterated with a new band of certain (e.g., maximum) width that can start after the channel found with the highest frequency.

If spike Fpk has a negative frequency near 0 (say in a margin of 10% of frequency $Fs_0$) there may also be a channel at $Fs_0$+|Fpk|. In some embodiments, this assumption should also be evaluated.

Of course, there may be situations where the spectrum contains several spikes. One single spike can be located between 0 and ½$Fs_0$, and it may be processed according to situation 1 described above. Whether there is a spike or not between 0 and ½$Fs_0$, there can be several spikes between −½$Fs_0$ and 0. In this case, the desired (e.g., highest) frequency spike is identified and processed according to situation 2 described above. This procedure is reiterated for the lower frequency spikes, i.e., by further reducing the band of the filter, until all the channels corresponding to these spikes are found.

In summary, instead of trying carrier and symbol frequencies in a bi-dimensional scan, some embodiments proceed by browsing a decision tree whose nodes are discovered through a carrier frequency scan.

Figure 5:
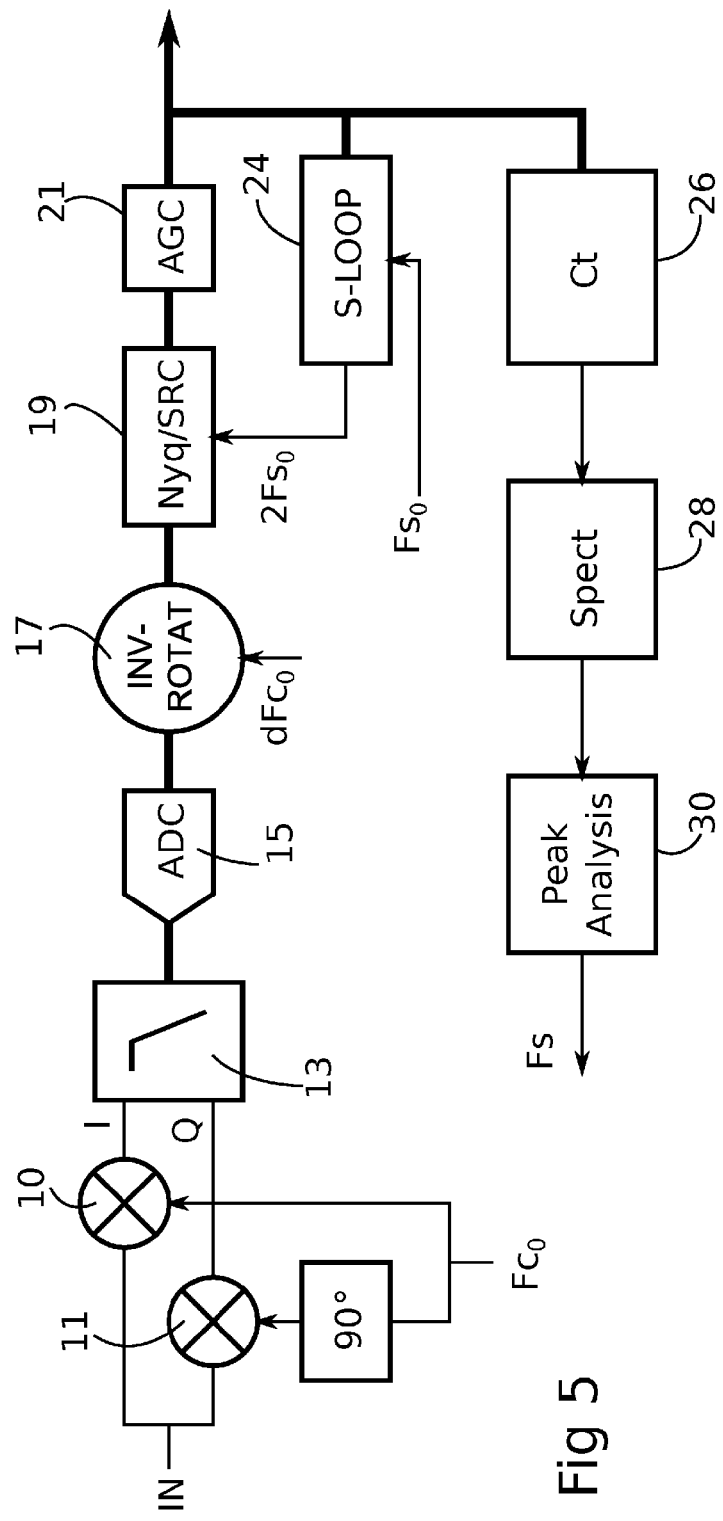
FIG. 5 schematically shows a demodulator of the type of FIG. 2 configured for achieving a fast blind search.

FIG. 5 shows the demodulator 100 of FIG. 2 in a modified configuration for performing a fast blind channel scan according to the above-described teachings. The demodulator 200 of FIG. 5 includes a circuit 26 for producing the complex indicator Ct from the samples S produced by circuit 19. A calculation circuit 28 builds the spectrum of this criterion. This spectrum is analyzed by a circuit 30 that finds the spikes and determines the symbol frequency Fs, or performs a new iteration with a narrower filter band.

The tried carrier frequency may be adjusted in two places. A coarse adjustment may be achieved at multipliers 10, 11, and a fine adjustment, $dFc_0$, may be achieved at the rotation correction circuit 17.

Many alternatives and modifications of the embodiments described herein will appear to those skilled in the art. A particular example of real and imaginary components of a complex criterion has been disclosed. The values of these components may be exchanged or constitute linear combinations (or other functions) of the given exemplary values; the nature of the calculated spectrum will change in consequence, remaining however exploitable.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method to search a digital transmission having unknown carrier and symbol frequencies in a modulated reception signal, comprising:
    performing successive trials of several carrier and symbol frequencies, using decreasing values of a currently tried symbol frequency;
    demodulating the modulated reception signal with a currently tried carrier frequency;
    filtering into a filtered signal the demodulated reception signal in a band having a width corresponding to the currently tried symbol frequency;
    producing successive samples of the filtered signal;
    for each currently tried symbol frequency:
        forming a complex indicator having a real component and an imaginary component established from the successive samples of the filtered signal such that the real component and the imaginary component have cyclostationary properties and such that one of the components tends to cancel when the other component tends towards a relative maximum;
        building a spectrum of variation of the complex indicator;
        searching for a singular spike in the spectrum; and
        determining the unknown symbol frequency from the frequency of the spike.

2. The method of claim 1, further comprising:
    if the spike is located in a first half of said band, determining the unknown symbol frequency from the frequency of the spike; else
    reiterating with a new currently tried symbol frequency smaller than half of the currently tried symbol frequency.

3. The method of claim 1 wherein one of the components of the complex indicator represents a timing error criterion of a Gardner algorithm, and the successive samples of the filtered signal are produced at twice the currently tried symbol frequency.

4. The method of claim 3 wherein the other component of the complex indicator represents a lock criterion of a loop used to adjust sampling times.

5. The method of claim 4 wherein the lock criterion represents a variation of a square of an amplitude of the successive samples between odd and even samples.

6. The method of claim 1 wherein building the spectrum comprises:
    calculating Fourier transforms of several groups of consecutive values of the complex indicator; and
    calculating average powers by frequency of the Fourier transforms.

7. The method of claim 1 wherein the components of the complex indicator are considered zero if a vector corresponding to a current sample turns less than 90° with respect to a vector of a previous sample.

8. A demodulator, comprising:
    an input circuit configured to receive an input signal, the input signal including an unknown carrier frequency and an unknown symbol frequency in a modulated reception signal;
    a multiplier circuit configured to extract an imaginary (I) signal and a real (Q) signal from the input signal and an applied demodulation signal;

a low pass filter circuit coupled to the multiplier circuit, the low pass filter circuit configured to attenuate high frequency signals;
an analog-to-digital converter (ADC) coupled to an output of the low pass filter circuit, the ADC configured to produce a vector output having I and Q components, the vector having a demodulation frequency error;
an inverse-rotation circuit configured to correct the demodulation frequency error and produce a corrected vector output having a corrected I component and a corrected Q component;
a sampling circuit configured to receive a sampling signal and configured to receive and sample the corrected I component and the corrected Q component signals;
a loop circuit configured to adjust a frequency and a phase of the sampling signal, the loop circuit and sampling circuit configured to:
loop through successive samples, each successive sample drawn with a current carrier frequency and a current symbol frequency, one or both of the current carrier frequency and the current symbol frequency being different for each successive sample; and
filter into a filtered signal the demodulated reception signal in a band having a width corresponding to the current symbol frequency;
a complex indicator circuit configured to form a complex indicator having a real component and an imaginary component established from the successive samples of the filtered signals, the real component and the imaginary components having cyclostationary properties wherein one of the real component and imaginary components tends to cancel when the other of the real component and imaginary component tends towards a relative maximum;
a calculation circuit configured to build a spectrum of variation of the complex indicator; and
a peak analysis circuit configured to:
search for a singular spike in the spectrum of variation;
determine a frequency of the spike; and
determine the unknown symbol frequency from the frequency of the spike.

9. The demodulator of claim 8 wherein the modulated reception signal has been quadrature phase modulated according to a quadrature phase shift keying (QPSK) method.

10. The demodulator of claim 8 wherein the modulated reception signal has been phase modulated according to a M-phase shift keying (M-PSK) method and M is a number of points of an associated modulation constellation.

11. The demodulator of claim 8 wherein the calculation circuit is configured to:
calculate Fourier transforms of several groups of consecutive values of the complex indicator; and
calculate average powers by frequency of the Fourier transforms.

12. The demodulator of claim 11 wherein the calculation circuit is configured to:
consider components of the complex indicator as zero if a vector corresponding to a current sample turns less than 90° with respect to a vector of a previous sample.

13. A system, comprising:
a satellite dish having a low noise clock down converter (LNB); and
a blind-search demodulator, the blind-search demodulator configured to receive a modulated input signal having an unknown carrier frequency and an unknown symbol frequency, the blind-search demodulator configured to determine the unknown symbol frequency from a frequency of a spike, the blind-search demodulator having:
a demodulating circuit configured to produce a rotatable vector from the modulated input signal;
a sampling circuit configured to receive and sample the rotatable vector, the sampling including looping through successive correctable vector samples and filtering the successive correctable vector samples in a band having a width corresponding to a current symbol frequency;
a complex indicator circuit configured to form a complex indicator from the successive samples of the filtered successive correctable vector samples, the complex indicator having cyclostationary properties wherein one of the complex indicator's real component and imaginary components tends to cancel when the other of the complex indicator's real component and imaginary component tends towards a relative maximum;
a calculation circuit configured to build a spectrum of variation of the complex indicator; and
a peak analysis circuit configured to search for the spike in the spectrum of variation and determine the frequency of the spike.

14. The system of claim 13 wherein the demodulating circuit comprises:
a multiplier circuit, a low pass filter circuit, an analog-to-digital converter (ADC), and an inverse-rotation circuit, the circuits operable to produce the rotatable vector.

15. The system of claim 14 wherein the inverse-rotation circuit is configured to receive an adjustable set point corresponding to a carrier frequency error.

16. The system of claim 13 wherein the sampling circuit is configured to be clocked at a frequency that is twice the symbol frequency.

17. The system of claim 16 wherein the sampling circuit is configured to filter the successive correctable vector samples within a band adjusted at plus or minus one half the symbol frequency.

18. The system of claim 13 wherein the sampling circuit comprises:
a first looping circuit coupled to the demodulating circuit, the first looping circuit configured to adjust a set point to be applied to the demodulating circuit; and
a second looping circuit configured to adjust a frequency and a phase of a sampling signal applied to the sampling circuit.

19. The system of claim 13 wherein the peak analysis circuit is configured to calculate Fourier transforms of several groups of consecutive values of the complex indicator and calculate average powers by frequency of the Fourier transforms.

20. The system of claim 13 wherein the LNB is configured to transpose modulated input signals in a 950-2150 MHz band.

* * * * *